United States Patent [19]

Schoen

[11] 4,071,794

[45] Jan. 31, 1978

[54] DC MOTOR WITH PERMANENT MAGNET RETAINING STRUCTURE

[75] Inventor: Roy C. Schoen, West Milton, Ohio

[73] Assignee: General Motors Corporation, Detroit, Mich.

[21] Appl. No.: 630,213

[22] Filed: Nov. 10, 1975

[51] Int. Cl.² .................................... H02K 21/26
[52] U.S. Cl. .................................. 310/154; 310/42; 310/257
[58] Field of Search ............ 310/154, 257, 254, 216, 310/218, 181, 42, 40 MM

[56] References Cited

U.S. PATENT DOCUMENTS

| 3,100,270 | 8/1963 | Case et al. | 310/154 |
| 3,135,887 | 6/1964 | Schaffan | 310/159 |
| 3,401,281 | 9/1968 | Martin et al. | 310/47 |
| 3,445,693 | 5/1969 | Crawshaw et al. | 310/42 |
| 3,489,937 | 1/1970 | Mahev et al. | 310/154 |
| 3,631,277 | 12/1971 | Ferdig et al. | 310/154 |

*Primary Examiner*—Donovan F. Duggan
*Attorney, Agent, or Firm*—Robert M. Sigler

[57] ABSTRACT

In a permanent magnet DC motor adapted for easy "drop-in" assembly within a generally cylindrical case having open and closed axial ends, a magnet retention member comprises a ring disposed within the case adjacent its closed end and provided with a plurality of resilient arms extending axially toward the open end, said arms grouped in pairs around the ring, each pair of arms disposed to receive an arcuate permanent magnet therebetween. The machine further includes an end cover adapted to close the open end of the case and provided with a plurality of fingers projecting axially between the pairs of resilient arms and being effective to bias the resilient arms to hold the arcuate magnets tightly against the inside of the case, the end cover further including a plurality of shoulders effective to cooperate with the ring to hold the arcuate magnets axially securely therebetween. The magnet retention member may include one or more studs projecting axially through openings in the closed end of the case to circumferentially orient the magnet retention apparatus and serve as mounting studs for the dynamoelectric machine.

4 Claims, 14 Drawing Figures

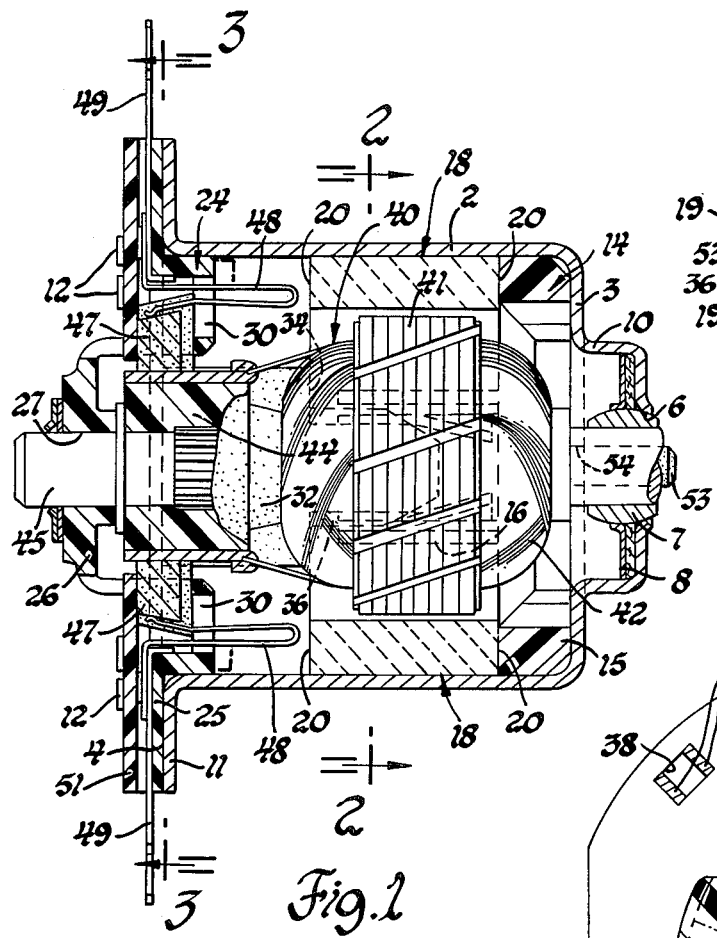
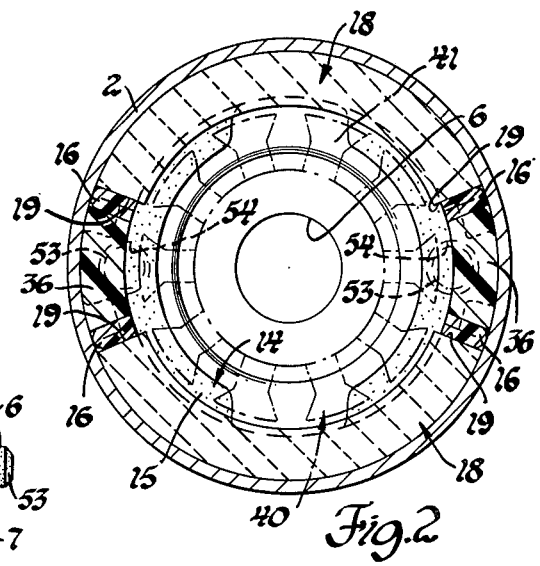
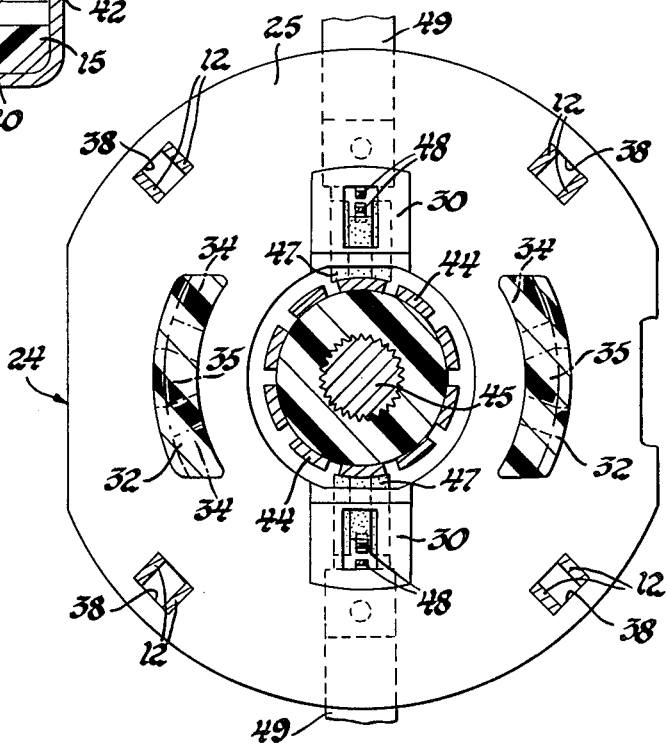
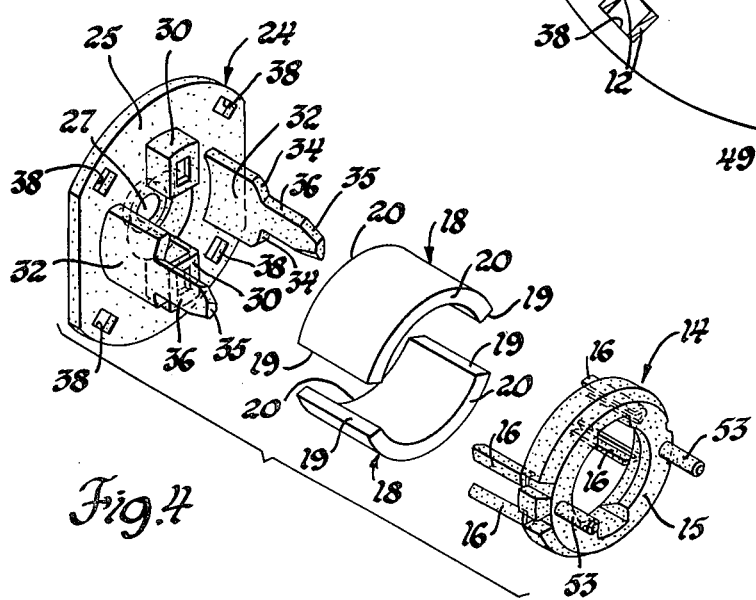

DC MOTOR WITH PERMANENT MAGNET RETAINING STRUCTURE

SUMMARY OF THE INVENTION

This invention relates to a dynamoelectric machine with a permanent magnet field adapted for easy "drop-in" assembly within a case. It is further directed toward such a machine in which a plurality of arcuate magnets are easily inserted into and securely held within a generally cylindrical case.

The magnet support structure includes a magnet retention member comprising a ring with axially projecting arms, which magnet retention member is dropped into the case with projecting arms extending toward the open end to receive arcuate permanent magnets therebetween. When the armature of the machine has been inserted, a cover member closes the end of the casing. This cover member includes fingers which project between the arms alternately with magnets and compress the arms to hold the magnets circumferentially and radially against the inside of the case. The cover member further includes a plurality of shoulders which bias the permanent magnets against the ring of the magnet retention member to fix them axially within the case.

One or more studs may project from the ring of the magnet retention member through openings provided in the closed end of the case to circumferentially orient the magnet retention apparatus or serve as mounting studs for the entire dynamoelectric machine.

Further details and advantages of this invention will be apparent from the accompanying drawings and description of a preferred embodiment.

SUMMARY OF THE INVENTION

FIG. 1 shows an axial cutaway view of a dynamoelectric machine according to this invention.

FIG. 2 shows a section view along lines 2—2 in FIG. 1.

FIG. 3 shows a section view along lines 3—3 in FIG. 1.

FIG. 4 shows an exploded view of a magent retention member, a pair of arcuate permanent magnets and a cover member for use in the dynamoelectric machine of FIG. 1.

DESCRIPTION OF THE PREFERRED EMBODIMENT

Referring to FIG. 1, a generally cylindrical case 2 formed from sheet steel has a closed axial end 3 and an open axial end 4. Closed axial end 3 has a central opening 6 therethrough, in which is placed a bearing 7. Bearing 7 is retained in opening 6 by a bearing retainer 8 inserted in an axial extension 10 of closed axial end 3. Open axial end 4 of case 2 is provided with a flange 11 with tabs 12 pressed axially outward therefrom for receiving a cover member as described below.

FIG. 4 shows an exploded view of the stator structure used in the machine of FIG. 1. A magnet retention member 14 is made from a plastic material such as glass filled nylon and has a main body comprising a ring 15 having an outer diameter just smaller than the inner diameter of case 2. A plurality of resilient arms 16 extend axially from one side of the ring 15. Each resilient arm 16 has a generally V-shaped cross section with an acute apex angle, one side of the "V" being attached to ring 15 and the other side being free, so that the arm can be compressed in the circumferential direction relative to ring 15. Resilient arms 15 are grouped in pairs, two pairs in this embodiment, to retain arcuate ceramic magnets 18 therebetween.

Magnets 18 are formed in arcuate sections having an outer diameter equal to or slightly less than the inner diameter of case 2. Each magnet 18 has circumferential ends 19 and axial ends 20.

Magnet retention member 14 is disposed within case 2 as shown within in FIG. 1. Arcuate magnets 18 are disposed adjacent the inner surface of case 2 with each circumferential end 19 abutting one of the resilient arms 16 and one axial end 20 abutting ring 15.

An end cover 24, shown in FIG. 4, comprises a flat cover portion 25 adapted to abut flange 11 of case 2. From flat cover portion 25 project, in one axial direction, an axial extention 26 with a central axial opening 27 and, in the opposite axial direction, a pair of brush boxes 30 and a pair of axially projecting fingers 32 with flanking shoulders 34. Each finger 32 has a tapered end 35 and a constant width middle section 36.

As shown in FIGS. 1 and 3, end cover 24 is placed against flange 11 of case 2 with fingers 32 projecting inwardly between the resilient arms 16 not having magnets 18 therebetween. Resilient arms 16 are thus seen to be placed so that magnets 18 and fingers 32 alternate between adjacent arms 16 all the way around the circle. Middle portions 36 of arms 32 and magnets 18 are of such size that the V-shaped resilient arms 16 are somewhat distorted or compressed by the insertion of fingers 32, which insertion is aided by tapered end 35. In this way, magnets 18 are held firmly between arms 16 and the inner surface of casing 2.

Openings 38 are provided in the flat cover portion 25 of end cover 24 to accomodate tabs 12 as end cover 24 is pushed toward flange 11 with fingers 32 sliding between arms 16. In addition, shoulders 34 engage one of the axial ends 20 of magnets 18 and press the other of the axial ends 20 of magnets 18 against ring 15 to hold magnets 18 axially within casing 2.

An armature 20 comprises a core 41, windings 42 and a commutator 44 mounted on a shaft 45, one end of which is rotatably supported in bearings 7 and the other end of which is rotatably supported in opening 27 of end cover 24. End cover 24 is formed of a lubricated phenolic material containing dispersed graphite or a similar lubricant so that opening 27 comprises a bearing for shaft 45.

Brushes 47 within brush boxes 30 are urged radially inward against commutator 44 by V-shaped springs 48 which are fixed to metallic connectors 49 recessed into appropriate depressions on the outer surface of end cover 24. An end cap 51 placed against the outer surface of end cover 24 has openings matching openings 38 to accomodate tabs 12, which are bent over end cap 51 to retain end cap 51, metallic connectors 49 and end cover 24 firmly adjacent flange 11.

The stator structure, particularly the magnet retention member 14 and magnets 18, can be circumferentially oriented to properly receive the cooperating portions of end cover 24 by means of one or more studs 53, shown in FIG. 4, adapted to project from ring 15 in the opposite axial direction from resilient arms 16 through appropriate openings 54 in the closed end 3 of casing 2. In addition to providing proper circumferential orientation of magnet retention member 14, these studs can serve as mounting studs for the entire dynamoelectric machine if used with appropriate self threading nuts.

The structure as described above is easily assembled by dropping the described parts in the proper order into the case 2. Beginning with case 2, bearings 7 and bearing retainer 8 are pressed into case 2, magnet retention member 14 is dropped into case 2 with studs 53, if any, projecting through the corresponding openings in closed end 3; magnets 18 are inserted between resilient arms 16; armature 40 is placed within casing 2 with one end in bearing 7; end cover 24 is placed over the open end 4 of case 2 and other end of armature 40 and pressed inward toward flange 11 to retain magnets 18; brushes 47 are inserted through appropriate openings into brush boxes 30; V-shaped springs 48 are inserted through appropriate openings into brush boxes 30 until connectors 49 are received in the appropriate indentations, whereupon brushes 47 are biased into engagement with commutator 44; end cap 51 is placed over end cover 24 and connectors 49; and tabs 12 of flange 11 are bent over end cap 51 to lock the structure in place.

The apparatus described above is a preferred embodiment of this invention. However, equivalent embodiments will occur to those skilled in the art; and this invention should therefore be limited only by the claims which follow.

The embodiments of the invention in which an exclusive property or privilege is claimed are defined as follows:

1. In a dynamoelectric machine having a cylindrical case with closed and open axial ends and a plurality of arcuate permanent magnets having circumferential and axial ends and being positioned circumferentially within the case, magnet retention apparatus adapted for easy drop-in assembly from the open end of the case and comprising:

a magnet retention member comprising a ring disposed within the case adjacent its closed end and a plurality of resilient arms extending axially therefrom toward the open end of the case, the arms comprising a pair for each permanent magnet, each pair of arms being adapted to receive the associated permanent magnet inserted axially therebetween and to abut opposite circumferential ends of the magnet inserted, an end cover adapted to close the open end of the case, the end cover including a plurality of fingers projecting axially inward therefrom for insertion between adjacent pairs of arms and engagement with one arm of each adjacent pair, each finger having a tapered end for aid in insertion between the arms and a constant-width portion effective to compress the resilient arms against the magnet circumferential ends and thereby retain the magnets radially and circumferentially between the arms and case, the end cover further including a plurality of shoulders effective to engage the permanent magnets on axial ends thereof and bias the permanent magnets with their opposite axial ends into engagement with the ring, whereby the permanent magnets are axially retained between the end cover and the magnet retention member.

2. In a dynamoelectric machine having a cylindrical case with closed and open axial ends and a plurality of arcuate permanent magnets having circumferential and axial ends and being positioned circumferentially with the case, magnet retention apparatus adapted for easy drop-in assembly from the open end of the case and comprising:

a magnet retention member comprising a ring fitting within the case adjacent its closed end and a plurality of resilient arms extending axially therefrom toward the open end of the case, each comprising two portions joined in a V-shaped cross section with an acute apex angle, one of which portions is fixed to the ring and the other of which free to move resiliently toward the one, the arms comprising a pair for each permanent magnet adapted to receive the magnet by its circumferential ends when inserted axially therebetween;

an end cover adapted to close the open end of the case, the end cover including a plurality of fingers projecting axially inward therefrom for insertion between the resilient arms not having magnets therebetween, each finger having a tapered end for air in insertion between the arms, a constant width middle portion effective to compress the portions of resilient arms toward each other and against the magnet circumferential ends to retain the magnets radially and circumferentially between the arms and the case, each finger further having a wider base portion defining a pair of shoulders, one on either side of the finger, effective to engage the permanent magnets on axial ends thereof and bias the permanent magnets with their opposite axial ends into engagement with the rings, whereby the permanent magnets are axially retained between the end cover and the magnet retention member.

3. Magnet retention apparatus according to claim 2 in which the magnet retention member further comprises one or more studs projecting axially in the opposite direction from the resilient arms into engagement with the closed end of the case to circumferentially orient the magnet retention member, and thus the magnet retention apparatus, within the case.

4. Magnet retention apparatus according to claim 3 in which the closed end of the case is provided with one or more openings and the studs project through said openings, whereby such studs may be used as mounting studs for the dynamoelectric machine.

* * * * *